US008973241B1

(12) United States Patent
Gooch

(10) Patent No.: US 8,973,241 B1
(45) Date of Patent: Mar. 10, 2015

(54) METHOD AND APPARATUS FOR JOINING COMPOSITE STRUCTURES

(75) Inventor: Paul L. Gooch, Everett, WA (US)

(73) Assignee: The Boeing Company, Chicago, IL (US)

( * ) Notice: Subject to any disclaimer, the term of this patent is extended or adjusted under 35 U.S.C. 154(b) by 217 days.

(21) Appl. No.: 13/605,604

(22) Filed: Sep. 6, 2012

(51) Int. Cl.
| B21D 39/00 | (2006.01) |
| B32B 3/00 | (2006.01) |
| B29C 65/00 | (2006.01) |
| B32B 7/04 | (2006.01) |
| B64D 11/00 | (2006.01) |
| B32B 3/12 | (2006.01) |
| F16B 12/12 | (2006.01) |

(52) U.S. Cl.
CPC .............. B64D 11/003 (2013.01); B64D 11/00 (2013.01); F16B 12/125 (2013.01)
USPC ............... 29/428; 403/291; 403/375; 428/57; 428/116; 156/60; 156/91; 156/349; 156/365

(58) Field of Classification Search
None
See application file for complete search history.

(56) References Cited

U.S. PATENT DOCUMENTS

| 5,680,934 | A | * | 10/1997 | Jaegers et al. ................. 206/586 |
| 6,164,477 | A | | 12/2000 | Druckman et al. |
| 6,325,568 | B1 | | 12/2001 | Druckman et al. |
| 7,963,038 | B2 | | 6/2011 | Schmitz |
| 2004/0065041 | A1 | * | 4/2004 | Staats .......................... 52/592.1 |
| 2014/0048176 | A1 | * | 2/2014 | Susnjara ....................... 144/344 |

OTHER PUBLICATIONS

"Failure behaviour of honeycomb sandwich corner joints and inserts," Composite Structures 89 (2009) 575-588.*
Reeves et al., "Self-Locking Joint for Panel Structures and Methods of Fabricating the Same," U.S. Appl. No. 13/605,991, filed Sep. 6, 2012, 43 Pages.

* cited by examiner

*Primary Examiner* — David Sample
*Assistant Examiner* — Nicole T Gugliotta
(74) *Attorney, Agent, or Firm* — Yee & Associates, P.C.

(57) ABSTRACT

A method and apparatus for forming a joint between a first composite structure and a second composite structure. A number of tab sections may be formed at an end of the first composite structure. The first composite structure may comprise a first skin, a second skin, and a core located between the first skin and the second skin. A tab section in the number of tab sections may comprise a first skin section of the first skin, a second skin section of the second skin, and a core section of the core. A portion of the core section may be removed from each tab section to form a number of tabs at the end of the first composite structure. The first composite structure may be attached to the second composite structure using the number of tabs to form the joint between the first composite structure and the second composite structure.

12 Claims, 14 Drawing Sheets

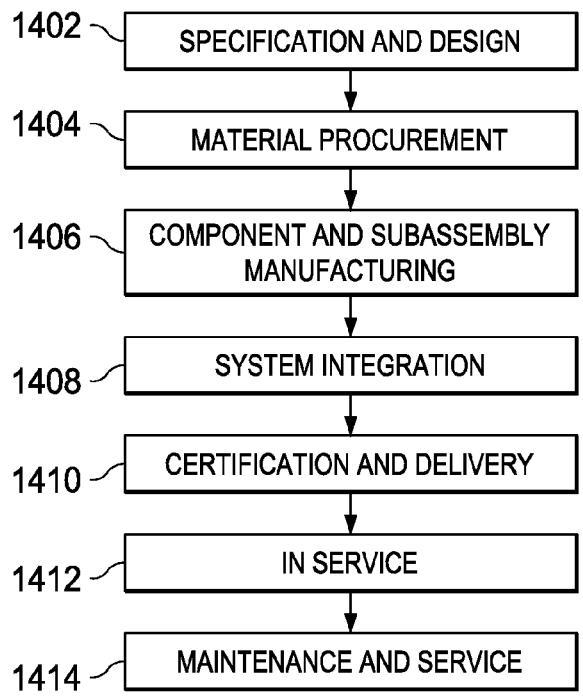
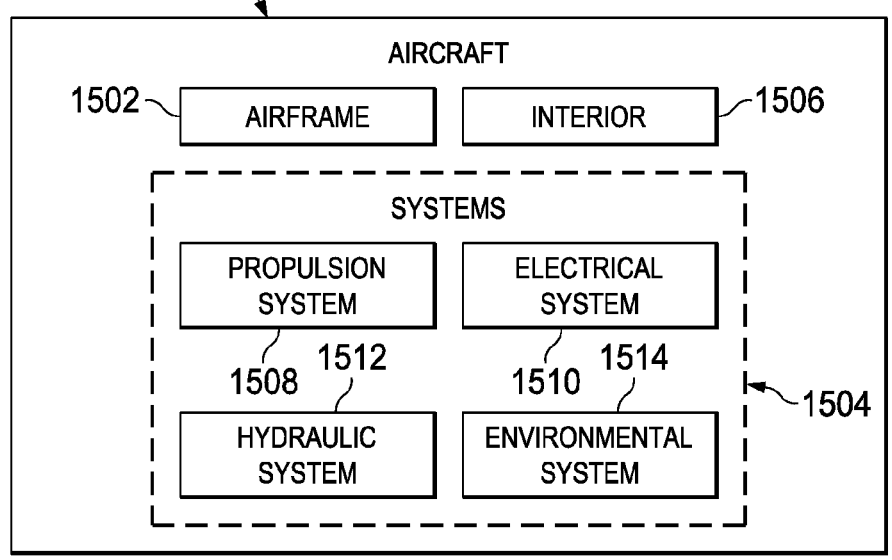

METHOD AND APPARATUS FOR JOINING COMPOSITE STRUCTURES

CROSS REFERENCE TO RELATED APPLICATION

This application is related to contemporaneously filed U.S. nonprovisional patent application Ser. No. 13/605,991, titled "Self-Locking Joints for Panel Structures and Methods of Fabricating the Same," filed on Sep. 6, 2012, the entire contents of which are incorporated herein by reference.

BACKGROUND INFORMATION

1. Field

The present disclosure relates generally to composite structures and, in particular, to joints between composite structures. Still more particularly, the present disclosure relates to a method and apparatus for joining two composite structures using a reduced amount of adhesive.

2. Background

Composite structures may be used to form various types of objects. These objects may include, for example, without limitation, a fuselage, an overhead bin in an aircraft, an automobile structure, a storage container, a part for a vehicle, a piece of equipment, a tool, a fastener, a beam, a support structure, and/or other types of objects.

In some cases, two composite structures may be attached to each other to form a joint. As one illustrative example, a first composite panel may be attached to a second composite panel to form a joint. As used herein, a "composite panel" may be comprised of a honeycomb core sandwiched by two skins. A "honeycomb core", as used herein, may be a layer of material comprising an array of hollow cells defined by vertical walls. These cells may have, for example, without limitation, a cylindrical shape, a cuboidal shape, a prism-type shape, a hexagonal shape, or some other type of shape.

Some currently available methods for forming a joint between two composite panels may include fabricating one or more tab sections at the end of a first composite panel and fabricating one or more slots, respectively, at a first surface of a second composite panel. Typically, the tab sections may be fabricated by cutting away a portion of the first composite panel at the end of the first composite panel. Each tab section may have a total width that includes the widths of the two skins and the width of the core of the first composite panel.

The first composite panel may be positioned relative to the second composite panel such that the tab sections at the end of the first composite panel can be inserted into the corresponding slots in the second composite panel. Adhesive may be applied within the slots in the second composite panel prior to insertion of the tab sections within the slots. When the tab sections of the first composite panel are inserted into the corresponding slots in the second composite panel to form the joint between these two composite panels, the adhesive may allow the tab sections to fixedly adhere to the insides of the slots.

However, with these currently available methods, the amount of adhesive required for forming the joint may be greater than desired. For example, without limitation, each slot into which a corresponding tab section is inserted may have a width that is substantially equal to the width of the corresponding tab section. Additionally, the slot may have a depth that is substantially equal to the height of the corresponding tab section.

Adhesive may need to be applied to the slot such that the adhesive fills substantially the entire volume of the slot. The weight added by the amount of adhesive needed to fill the volume of the slot may be greater than desired. Further, when adhesive is applied such that the adhesive fills substantially the entire volume of the slot, insertion of a tab section into the slot may cause spillover of adhesive over the first surface of the second composite panel. The time and/or effort required to clean this excess adhesive may be greater than desired.

In some cases, the sizes of the slots formed in the second composite panel may reduce the structural integrity of the second composite panel outside of selected tolerances. Additionally, the sizes of these slots may cause a second surface of the second composite panel that is opposite to the first surface of the second composite panel, on which the slots are present, to have an undesired visual appearance.

For example, without limitation, locations on the second surface corresponding to the locations of the slots within the second composite panel may appear darker and/or lighter relative to the rest of the second surface of the second composite panel more than desired. In some cases, these darker and/or lighter locations on the second surface of the second composite panel may reduce the overall aesthetic appeal of the second composite panel. This reduction in aesthetic appeal may be undesirable when the second surface is used as, for example, without limitation, a decorative surface. Additionally, locations on the second surface corresponding to the locations of the slots within the second composite panel may be raised or dimpled in an undesired manner. Therefore, it may be desirable to have a method and apparatus that takes into account at least some of the issues discussed above, as well as other possible issues.

SUMMARY

In one illustrative embodiment, a method for forming a joint between a first composite structure and a second composite structure may be present. A number of tab sections may be formed at an end of the first composite structure. The first composite structure may comprise a first skin, a second skin, and a core located between the first skin and the second skin. A tab section in the number of tab sections may comprise a first skin section of the first skin, a second skin section of the second skin, and a core section of the core. A portion of the core section may be removed from each tab section in the number of tab sections to form a number of tabs at the end of the first composite structure. The first composite structure may be attached to the second composite structure using the number of tabs at the end of the first composite structure to form the joint between the first composite structure and the second composite structure.

In another illustrative embodiment, a method for forming a joint between a first composite structure and a second composite structure may be present. A number of tab sections may be formed at an end of the first composite structure. The first composite structure may comprise a first skin, a second skin, and a core located between the first skin and the second skin. A tab section in the number of tab sections may comprise a first skin section of the first skin, a second skin section of the second skin, and a core section of the core. A portion of the core section may be removed from each tab section in the number of tab sections to form a number of tabs at the end of the first composite structure. A number of slots may be formed at a first surface of the second composite structure. Each slot in the number of slots may extend towards a second surface of the second composite structure without reaching the second surface. Adhesive may be applied within the number of slots in the second composite structure. The number of tabs at the end of the first composite structure may be inserted into the number of slots in the second composite structure to form the joint between the first composite structure and the second composite structure. An edge of the core of the first composite structure may substantially conform to the first surface of the second composite structure when the first composite structure is attached to the second composite structure.

In yet another illustrative embodiment, an apparatus may comprise a first composite structure and a second composite structure. The first composite structure may comprise a first skin, a second skin, a core located between the first skin and the second skin, and a number of tab sections at an end of the first composite structure. A tab section in the number of tab sections may comprise a first skin section of the first skin, a second skin section of the second skin, and a core section of the core. A portion of the core section may be removed from each tab section in the number of tab sections to form a number of tabs at the end of the first composite structure. The first composite structure may be configured to be attached to the second composite structure using the number of tabs at the end of the first composite structure to form a joint between the first composite structure and the second composite structure.

In still yet another illustrative embodiment, an apparatus may comprise a first composite structure and a second composite structure. The first structure may comprise a first skin, a second skin, a core located between the first skin and the second skin, and a number of tab sections at an end of the first composite structure. A tab section in the number of tab sections may comprise a first skin section of the first skin, a second skin section of the second skin, and a core section of the core. A portion of the core section may be removed from each tab section in the number of tab sections to form a number of tabs at the end of the first composite structure. The second composite structure may comprise a number of slots at a first surface of the second composite structure. Each slot in the number of slots may be configured to extend towards a second surface of the second composite structure without reaching the second surface of the second composite structure. The number of tabs at the end of the first composite structure may be configured to be inserted into the number of slots in the second composite structure to form a joint between the first composite structure and the second composite structure at a selected angle.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 14 is an illustration of an aircraft manufacturing and service method in accordance with an illustrative embodiment; and FIG. 15 is an illustration of an aircraft in the form of a block diagram in accordance with an illustrative embodiment.

DETAILED DESCRIPTION

The different illustrative embodiments recognize and take into account different considerations. For example, the illustrative embodiments recognize and take into account that it may be desirable to have a method for forming a joint between composite panels that uses a reduced amount of adhesive as compared to some currently available methods.

Further, the illustrative embodiments recognize that it may be desirable to have a method for forming a joint between composite panels that requires less time and/or effort to clean up excess adhesive that has spilled over onto the surface of a composite panel as compared to some currently available methods. Additionally, the different illustrative embodiments take into account that it may be desirable to have a method or apparatus for forming a joint between a first composite panel and a second composite panel that does not reduce the aesthetic appeal of a surface of the second composite panel used as a decorative surface.

Thus, the different illustrative embodiments provide a method and apparatus for joining composite structures. In one illustrative embodiment, a method for forming a joint between a first composite structure and a second composite structure may be present. A number of tab sections may be formed at an end of the first composite structure. The first composite structure may comprise a first skin, a second skin, and a core located between the first skin and the second skin. A tab section in the number of tab sections may comprise a first skin section of the first skin, a second skin section of the second skin, and a core section of the core. A portion of the core section may be removed from each tab section in the the first composite structure. The first composite structure may be attached to the second composite structure using the number of tabs at the end of the first composite structure to form the joint between the first composite structure and the second composite structure.

Figure 1:
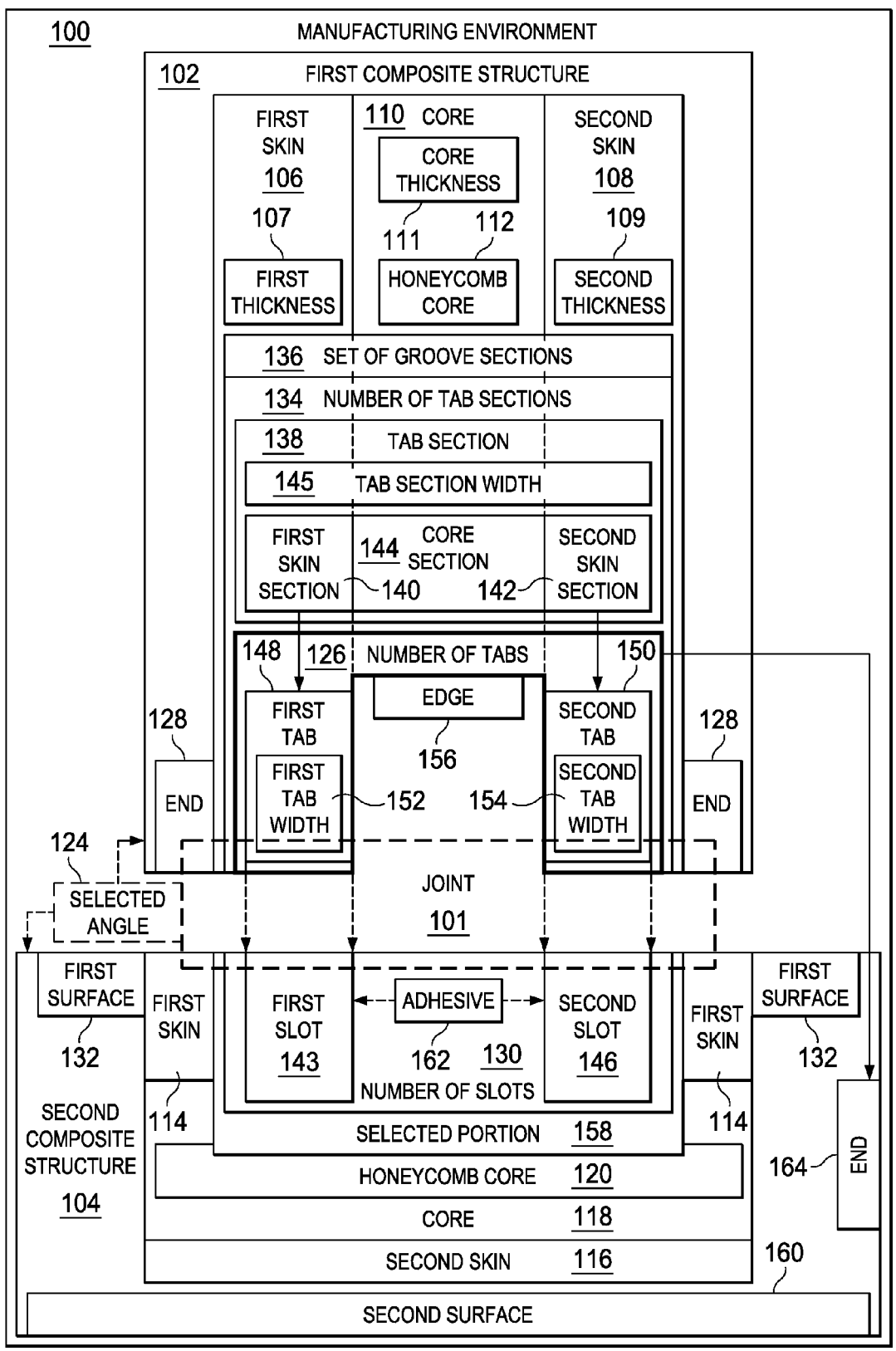
FIG. 1 is an illustration of a manufacturing environment in the form of a block diagram in accordance with an illustrative embodiment.

With reference now to FIG. 1, an illustration of a manufacturing environment in the form of a block diagram is depicted in accordance with an illustrative embodiment. In FIG. 1, manufacturing environment 100 may be an example of an environment in which the different illustrative embodiments may be implemented to form joint 101 between first composite structure 102 and second composite structure 104. In one illustrative example, first composite structure 102 and second composite structure 104 may be referred to as composite panels.

As depicted, first composite structure 102 may comprise first skin 106, second skin 108, and core 110. In some cases, first skin 106 and second skin 108 may be referred to as face sheets. Core 110 may be located between first skin 106 and second skin 108. In particular, first composite structure 102 may be fabricated by attaching first skin 106 and second skin 108 to core 110 such that core 110 is sandwiched between first skin 106 and second skin 108.

As used herein, a first item, such as first skin 106, may be "attached" to a second item, such as core 110, in any number of different ways. For example, without limitation, a first item may be attached to a second item by being fastened, adhered, mechanically joined, melded, welded, and/or connected to the second item in some other manner. In some cases, the first item may be attached to the second item using adhesives. In other illustrative examples, the first item may be attached to the second item using a brazing technique, a curing technique, or some other type of joining technique.

In these illustrative examples, first skin 106 may have first thickness 107; second skin 108 may have second thickness 109; and core 110 may have core thickness 111.

In some illustrative examples, core 110 may take the form of honeycomb core 112. Of course, in other illustrative examples, core 110 may take the form of an open cell foam core, a closed cell foam core, or some other type of core.

Honeycomb core 112 may have a geometry that resembles a honeycomb. In other words, honeycomb core 112 may be an array of hollow cells formed by thin vertical walls. In one illustrative example, these vertical walls may be substantially perpendicular to first skin 106 and second skin 108 in first composite structure 102. The cells in honeycomb core 112 may have a shape selected from one of, for example, without limitation, a columnar shape, a hexagonal shape, a prism-type shape, a cuboidal shape, an octagonal shape, a pentagonal shape, or some other type of shape.

Similar to first composite structure 102, second composite structure 104 may comprise first skin 114, second skin 116, and core 118. First skin 114, second skin 116, and core 118 of second composite structure 104 may be configured similar to first skin 106, second skin 108, and core 110, respectively, of first composite structure 102. In particular, second composite structure 104 may be fabricated by attaching first skin 114 and second skin 116 to core 118 such that core 118 is sandwiched between first skin 114 and second skin 116. In these illustrative examples, core 118 may take the form of honeycomb core 120.

First skin 106 and second skin 108 of first composite structure 102 and first skin 114 and second skin 116 of second composite structure 104 may be comprised of any number of different materials. These materials may include, for example, without limitation, a composite material, metal, plastic, and/or other suitable types of materials. In some cases, these skins may be comprised of one or more composite materials including, but not limited to, glass-reinforced plastic, carbon fiber-reinforced plastic (CFRP), thermoplastic, a thermoset polymer, a composite polymer, and/or other types of composite materials.

Further, core 110 of first composite structure 102 and core 118 of second composite structure 104 may be comprised of any number of different materials. These materials may include, for example, without limitation, polyurethane, aluminum, glass-reinforced plastic such as fiberglass, carbon fiber-reinforced plastic, a thermoplastic material, an aramid fiber material, a meta-aramid material, a foam material, and/or other types of materials. In this manner, core 110 and core 118 may be comprised of any composition of materials.

In these illustrative examples, first composite structure 102 and second composite structure 104 may be attached to each other to form joint 101. Joint 101 may be formed such that first composite structure 102 is attached to second composite structure 104 at selected angle 124 relative to second composite structure 104. Selected angle 124 may be, for example, without limitation, about 90 degrees, about 60 degrees, about 45 degrees, or some other angle.

Joint 101 may be formed in a number of different ways. In one illustrative example, number of tabs 126 may be formed at end 128 of first composite structure 102, while number of slots 130 may be formed at first surface 132 of second composite structure 104. Number of tabs 126 on first composite structure 102 may be inserted into number of slots 130 in second composite structure 104 to form joint 101. As used herein, a "number of" items, such as number of tabs 126 and number of slots 130, means one or more items. In this manner, number of tabs 126 and number of slots 130 may be one or more tabs and one or more slots, respectively.

In these illustrative examples, number of tabs 126 may be formed from number of tab sections 134 at end 128 of first composite structure 102. In particular, number of tab sections 134 and set of groove sections 136 may be fabricated at end 128 of first composite structure 102. As used herein, a "set of" items may be zero or more items. In this manner, a set of items, such as set of groove sections 136, may be a null set or an empty set.

A groove section in set of groove sections 136 may be located adjacent to at least one tab section in number of tab sections 134. In some cases, a groove section in set of groove sections 136 may be located between two tab sections. In this manner, the tab sections in number of tab sections 134 and the groove sections in set of groove sections 136 may be alternating sections. In some cases, when number of tab sections 134 comprises a single tab, set of groove sections 136 may be a null set.

In these illustrative examples, a tool (not shown) may be used to cut first composite structure 102 at end 128 such that number of tab sections 134 and set of groove sections 136 are formed at end 128. The tool (not shown) may take the form of, for example, without limitation, a cutting tool, a routing tool, a saw, a drill, or some other type of tool.

Number of tab sections 134 may be formed such that each tab section in number of tab sections 134 includes first skin 106, second skin 108, and core 110. Tab section 138 may be an example of one of number of tab sections 134. As depicted, tab section 138 may include first skin section 140 of first skin 106, second skin section 142 of second skin 108, and core section 144 of core 110. Tab section 138 may have tab section width 145. Tab section width 145 may be substantially equal to the sum of first thickness 107 of first skin 106, second thickness 109 of second skin 108, and core thickness 111 of core 110.

In these illustrative examples, at least a portion of core section 144 may be removed from tab section 138 to form first tab 148 and second tab 150. As used herein, a "portion" of an item, such as a portion of core section 144, may be some of the item or the entire item. In this manner, some of core section 144 or the entire core section 144 may be removed to form first tab 148 and second tab 150.

In particular, when this portion of core section 144 is removed, first tab 148 may be the portion of first skin section 140 that is left not contacting any of core section 144. Further, second tab 150 may be the portion of second skin section 142 that is left not contacting any of core section 144.

In some illustrative examples, first tab 148 and second tab 150 may be formed by removing at least one of a portion of first skin section 140 and a portion of second skin section 142 from tab section 138, in addition to the portion of core section 144. In this manner, first tab 148 may have first tab width 152 that is one of substantially equal to or less than first thickness 107 of first skin 106. Second tab 150 may have second tab width 154 that is one of substantially equal to or less than second thickness 109.

Of course, in other illustrative examples, only one tab may be formed from tab section 138. As one illustrative example, the entire core section 144 and the entire second skin section 142 within tab section 138 may be removed to form first tab 148. In another illustrative example, the entire core section 144 and the entire first skin section 140 within tab section 138 may be removed to form second tab 150.

In these illustrative examples, number of tabs 126 may be formed by manually removing a portion of core section 144, a portion of first skin section 140, and/or a portion of second skin section 142 using any number of tools. The different tools that may be used may include, for example, without limitation, a cutting tool, a routing tool, a sanding tool, and/or other types of tools. Of course, depending on the implementation, the portion of core section 144, the portion of first skin section 140, and/or the portion of second skin section 142 may be removed using an automated machine. In some cases, number of tabs 126 may be formed using some other type of process and/or other types of devices.

In these illustrative examples, fabricating number of tab sections 134 and fabricating number of tabs 126 from number of tab sections 134 may leave core 110 of first composite structure 102 with edge 156 near end 128 of first composite structure 102. In one illustrative example, edge 156 may be formed as a substantially planar edge. The contour of edge 156 may determine the type of joint 101 formed by first composite structure 102 and second composite structure 104 in these examples. Edge 156 may be formed such that the contour of edge 156 allows joint 101 to be formed with selected angle 124.

As depicted, selected portion 158 of second composite structure 104 may be removed to form number of slots 130 at first surface 132 of second composite structure 104. Selected portion 158 may be a discontinuous portion when more than one slot is formed. Number of slots 130 may be formed such that each slot opens at first surface 132 of second composite structure 104 and extends into core 118 of second composite structure 104. In these illustrative examples, first surface 132 of second composite structure 104 may be an outer surface of first skin 114 that is not in contact with core 118.

As depicted, number of slots 130 may not extend past core 118 into second skin 116. In other words, number of slots 130 may extend towards second surface 160 of second composite structure 104 but may not reach second surface 160. Second surface 160 of second composite structure 104 may be an outer surface of second skin 116 that is not in contact with core 118. In this manner, first surface 132 and second surface 160 may be opposite outer surfaces of second composite structure 104.

In these illustrative examples, number of slots 130 may be formed such that a slot in number of slots 130 is configured to receive a tab in number of tabs 126. In particular, each slot in number of slots 130 may be formed such that the slot forms a tight fit with a corresponding tab inserted into the slot.

As used herein, a "tight fit" may be formed between a tab and a slot when movement of the tab within the slot is restricted to within selected tolerances. In one illustrative example, first slot 143 and second slot 146 may be formed having sizes configured such that a tight fit is formed between first tab 148 and first slot 143 and between second tab 150 and second slot 146.

Number of tabs 126 may be inserted into number of slots 130 to form joint 101 between first composite structure 102 and second composite structure 104. In one illustrative example, adhesive 162 may be applied within number of slots 130 prior to inserting number of tabs 126 into number of slots 130. When number of tabs 126 is inserted into number of slots 130, adhesive 162 may surround number of tabs 126. In this manner, first composite structure 102 may be attached to second composite structure 104 using number of tabs 126, number of slots 130, and adhesive 162.

With each slot in number of slots 130 configured to have a size that provides a tight fit with a corresponding tab in number of tabs 126 and with each tab in number of tabs 126 configured to have a tab width smaller than tab section width 145, the amount of adhesive 162 needed to fill the volume of each slot in number of slots 130 may not exceed a selected threshold. In particular, the amount of adhesive 162 used may be sufficiently small such that the spillover of adhesive 162 onto first surface 132 after number of tabs 126 is inserted into number of slots 130 is reduced to within selected tolerances.

In these illustrative examples, number of tabs 126 is inserted into number of slots 130 such that edge 156 of core 110 contacts first surface 132 of second composite structure 104. In particular, edge 156 of core 110 may substantially conform to first surface 132 of second composite structure 104 when number of tabs 126 is inserted into number of slots 130. Adhesive 162 within number of slots 130 may be allowed to harden such that first composite structure 102 remains attached to second composite structure 104 to form joint 101.

In some illustrative examples, first surface 132 may be a curved surface or some other type of non-planar surface. In these examples, number of tab sections 134 and number of tabs 126 may be formed such that edge 156 of core 110 has a contour configured to substantially conform to first surface 132 even when first surface 132 is not substantially planar.

In this manner, the illustrative embodiments may provide a method for forming joint 101 between first composite structure 102 and second composite structure 104. Using number of tabs 126 and number of slots 130, joint 101 may be formed in a manner that reduces the time and/or effort needed to clean up excess adhesive 162 after joint 101 has been formed.

Further, the size of each slot in number of slots 130 may be configured such that number of slots 130 may not show through second surface 160 more than desired. In other words, the visual appearance of second surface 160 may not be affected by number of slots 130 more than desired when second surface 160 is, for example, without limitation, a decorative surface.

The illustration of manufacturing environment 100 in FIG. 1 is not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

In some illustrative examples, number of tabs 126 may be used to attach first composite structure 102 to second composite structure 104 without using number of slots 130. For example, without limitation, number of tabs 126 may be only formed by second skin section 142 and not by first skin section 140. As one specific example, number of tabs 126 may be a single tab comprising the entire second skin section 142. In one illustrative example, number of tabs 126 may be a single tab comprising the entire second skin section 142. Number of tabs 126 may be positioned at end 164 of second composite structure 104 such that number of tabs 126 may contact end 164 of second composite structure 104.

Further, number of tabs 126 may be positioned at end 164 of second composite structure 104 such that edge 156 of core 110 of first composite structure 102 contacts first surface 132 of second composite structure 104. In particular, edge 156 of core 110 may cover a portion of first surface 132 at end 164 of second composite structure 104, while number of tabs 126 may cover end 164 of second composite structure 104. Adhesive 162 may be applied to end 164 prior to number of tabs 126 being positioned at end 164 of second composite structure 104. Adhesive 162 may be used to allow first composite structure 102 to remain attached to end 164 of second composite structure 104 and form joint 101. This type of joint 101 may be referred to as a "corner joint."

Another type of corner joint may be formed when a first portion of number of tabs 126 is inserted into number of slots 130 such that a second portion of number of tabs 126 is positioned relative to end 164 of second composite structure 104. Adhesive 162 may have been previously applied within number of slots 130 and onto end 164 of second composite structure 104.

The first portion of number of tabs 126 may be formed by first skin section 140 only. The second portion of number of tabs 126 may comprise the entire second skin section 142 and may contact and adhere to end 164 of second composite structure 104 when the first portion of number of tabs 126 is inserted into number of slots 130. In this manner, number of tabs 126 may include a greater number of tabs than there are slots in number of slots 130.

In other illustrative examples, core 110 of first composite structure 102 and/or core 118 of second composite structure 104 may not be honeycomb cores. Instead, one of or both of these cores may have a different type of geometry. In still other illustrative examples, one or more composite structures, in addition to first composite structure 102, may be attached to second composite structure 104. In some cases, another composite structure may be attached to first composite structure 102 in a manner similar to the manner in which first composite structure 102 may be attached to second composite structure 104.

With reference now to FIGS. 2-9, illustrations of a process for forming a joint between two composite structures are depicted in accordance with an illustrative embodiment. In these illustrative examples, two composite structures may be attached using tabs and slots in a manner similar to the manner described in FIG. 1.

Figure 2:
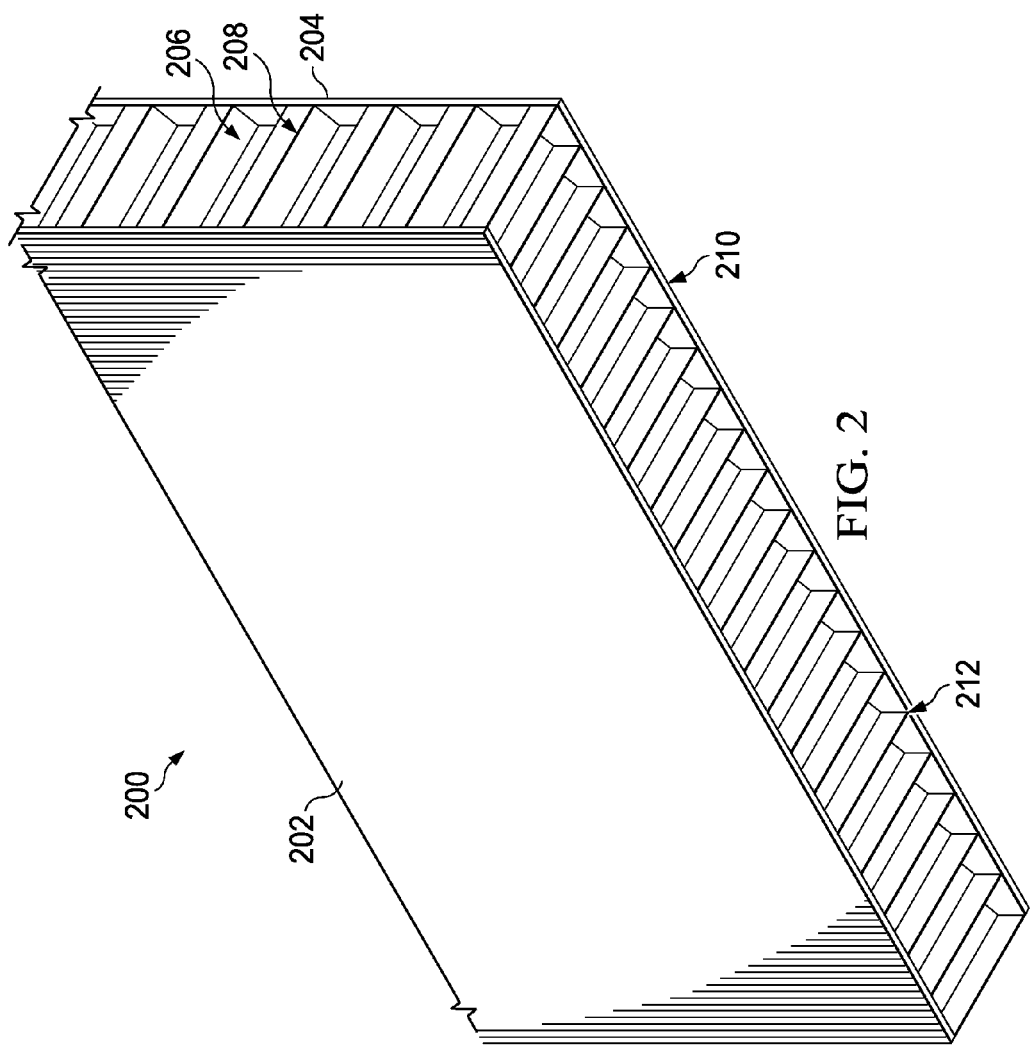
FIG. 2 is an illustration of an bottom isometric view of a portion of a first composite structure in accordance with an illustrative embodiment.

Turning now to FIG. 2, an illustration of an bottom isometric view of a portion of a first composite structure is depicted in accordance with an illustrative embodiment. In this illustrative example, a portion of first composite structure 200 may be depicted. First composite structure 200 may be an example of one implementation for first composite structure 102 in FIG. 1.

As depicted, first composite structure 200 may comprise first skin 202, second skin 204, and core 206. First skin 202, second skin 204, and core 206 may be examples of implementations for first skin 106, second skin 108, and core 110, respectively, in FIG. 1. In this illustrative example, core 206 may take the form of honeycomb core 208.

First composite structure 200 may have end 210. End 210 of first composite structure 200 may be an example of one end of first composite structure 200 at which a number of tabs (not shown) may be formed. Further, core 206 may have edge 212.

Figure 3:
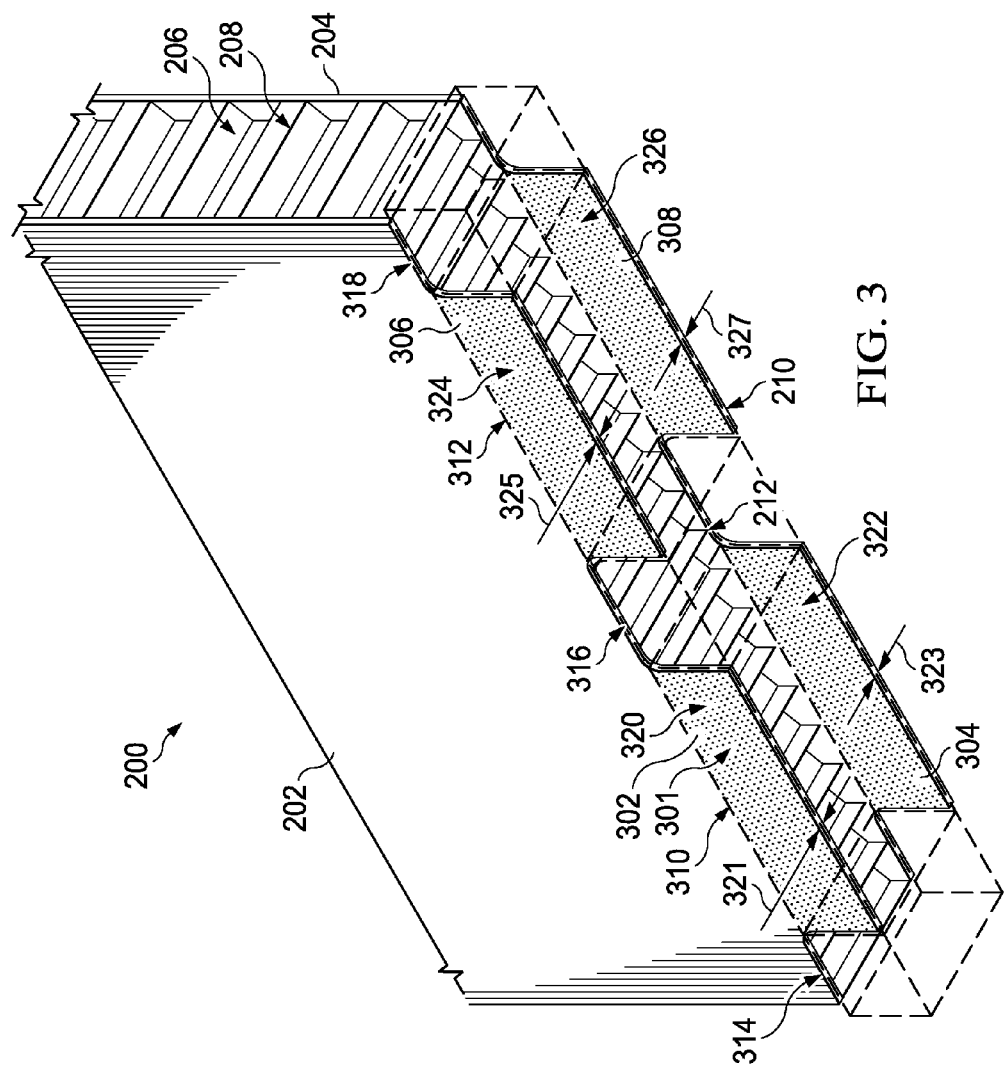
FIG. 3 is an illustration of a bottom isometric view of tabs on a first composite structure in accordance with an illustrative embodiment.

With reference now to FIG. 3, an illustration of a bottom isometric view of tabs on first composite structure 200 from FIG. 2 is depicted in accordance with an illustrative embodiment. In this illustrative example, number of tabs 301 may be present at end 210 of first composite structure 200. Number of tabs 301 may be an example of one implementation for number of tabs 126 in FIG. 1.

As depicted, number of tabs 301 may include tab 302, tab 304, tab 306, and tab 308. Tab 302 and tab 304 may be formed from tab section 310 at end 210 of first composite structure 200. Tab 306 and tab 308 may be formed from tab section 312 at end 210 of first composite structure 200. Tab section 310 and tab section 312 may be examples of implementations for tab sections in number of tab sections 134 in FIG. 1.

In this illustrative example, groove section 314, groove section 316, and groove section 318 may also be present at end 210 of first composite structure 200. Groove section 314, groove section 316, and groove section 318 may be examples of implementations for groove sections in set of groove sections 136 in FIG. 1.

As depicted, tab section 310 may include first skin section 320 of first skin 202, second skin section 322 of second skin 204, and a core section (not shown) of core 206 that has been removed. Tab 302 and tab 304 may have been formed from tab section 310 by removing substantially the entire core section (not shown) of tab section 310. Tab 302 may be formed by first skin section 320. Tab 304 may be formed by second skin section 322.

Tab 302 and tab 304 may have tab width 321 and tab width 323, respectively. Tab width 321 and tab width 323 may be substantially equal to the thickness of first skin section 320 and second skin section 322, respectively.

Similarly, tab section 312 may include first skin section 324 of first skin 202, second skin section 326 of second skin 204, and a core section (not shown)) of core 206 that has been removed. Tab 306 and tab 308 may have been formed by removing substantially the entire core section (not shown) of tab section 312. Tab 306 may be formed by first skin section 324, while tab 308 may be formed by second skin section 326.

Tab 306 and tab 308 may have tab width 325 and tab width 327, respectively. Tab width 325 and tab width 327 may be substantially equal to the thickness of first skin section 324 and second skin section 326, respectively.

Figure 4:
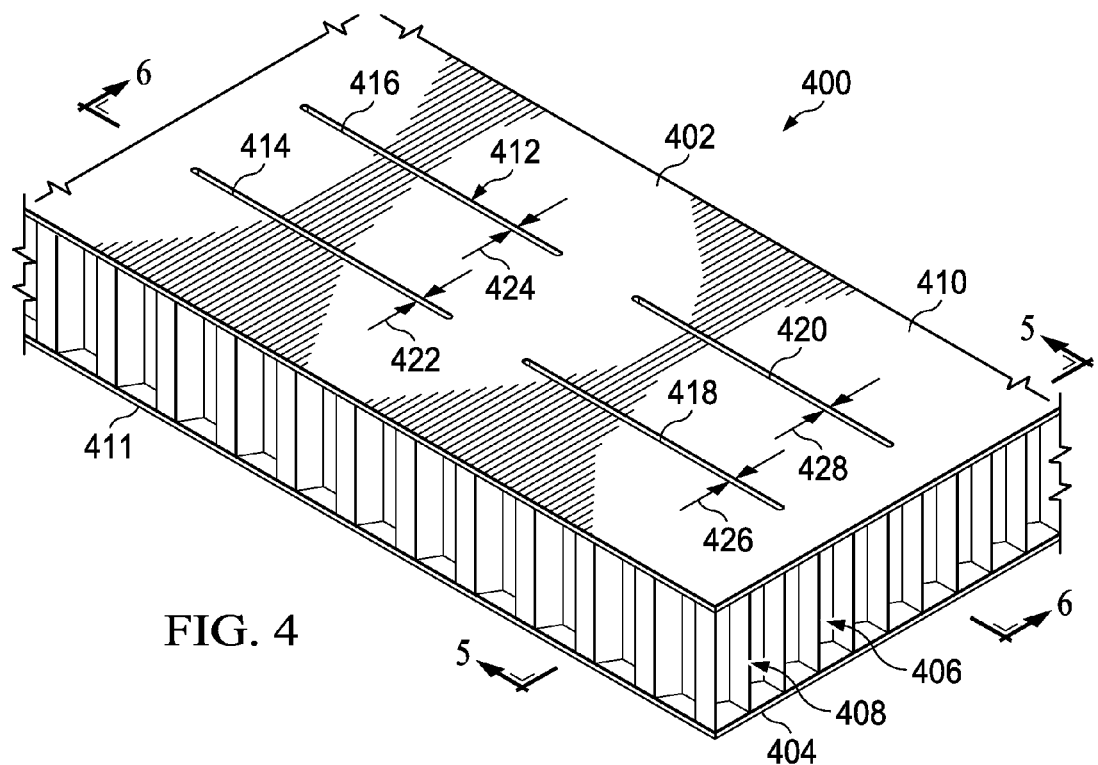
FIG. 4 is an illustration of a top isometric view of a portion of a second composite structure in accordance with an illustrative embodiment.

With reference now to FIG. 4, an illustration of a top isometric view of a portion of a second composite structure is depicted in accordance with an illustrative embodiment. In FIG. 4, a portion of second composite structure 400 may be depicted. Second composite structure 400 may be an example of one implementation for second composite structure 104 in FIG. 1.

As depicted, second composite structure 400 may comprise first skin 402, second skin 404, and core 406. First skin 402, second skin 404, and core 406 may be examples of implementations for first skin 114, second skin 116, and core 118, respectively, in FIG. 1. In this illustrative example, core 406 may take the form of honeycomb core 408.

Number of slots 412 may be present in second composite structure 400. In particular, number of slots 412 may be formed at first surface 410 of second composite structure 400. First surface 410 may be the outer surface of first skin 402 in this example. Number of slots 412 may extend towards second surface 411 of second composite structure 400 but may not reach second surface 411. Second surface 411 may be the outer surface of second skin 404 in this example.

In this illustrative example, number of slots 412 may include slot 414, slot 416, slot 418, and slot 420. Slot 414, slot 416, slot 418, and slot 420 may be configured to receive tab 302, tab 304, tab 306, and tab 308, respectively, from FIG. 3.

Slot 414, slot 416, slot 418, and slot 420 may have width 422, width 424, width 426, and width 428, respectively. These widths may be selected such that tab 302, tab 304, tab 306, and tab 308 may be inserted into slot 414, slot 416, slot 418, and slot 420, respectively, with tight fits. Width 422, width 424, width 426, and width 428 may be substantially equal to tab width 321, tab width 323, tab width 325, and tab width 327, respectively, in FIG. 3.

Figure 5:
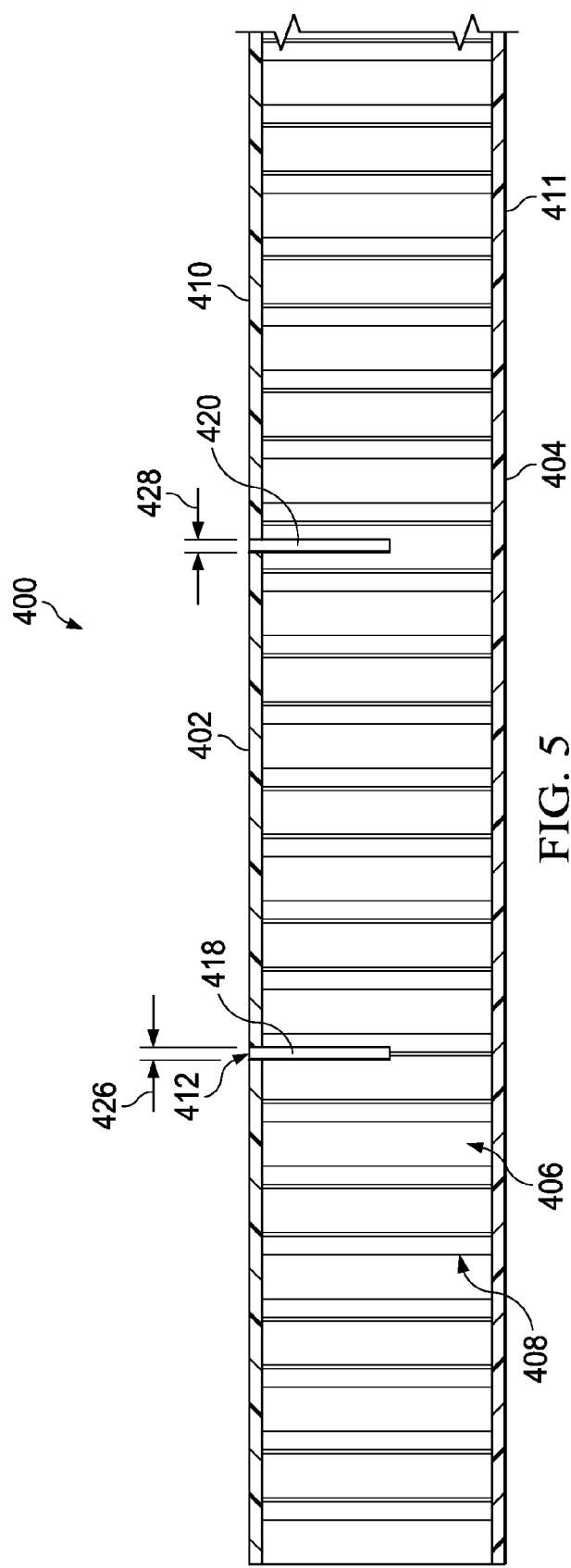
FIG. 5 is an illustration of a cross-sectional view of a second composite structure in accordance with an illustrative embodiment.

With reference now to FIG. 5, an illustration of a cross-sectional view of second composite structure 400 from FIG. 4 is depicted in accordance with an illustrative embodiment. In FIG. 5, a cross-sectional view of second composite structure 400 from FIG. 4 taken along lines 5-5 may be depicted. Slot 418 and slot 420 may be seen in this view.

Figure 6:
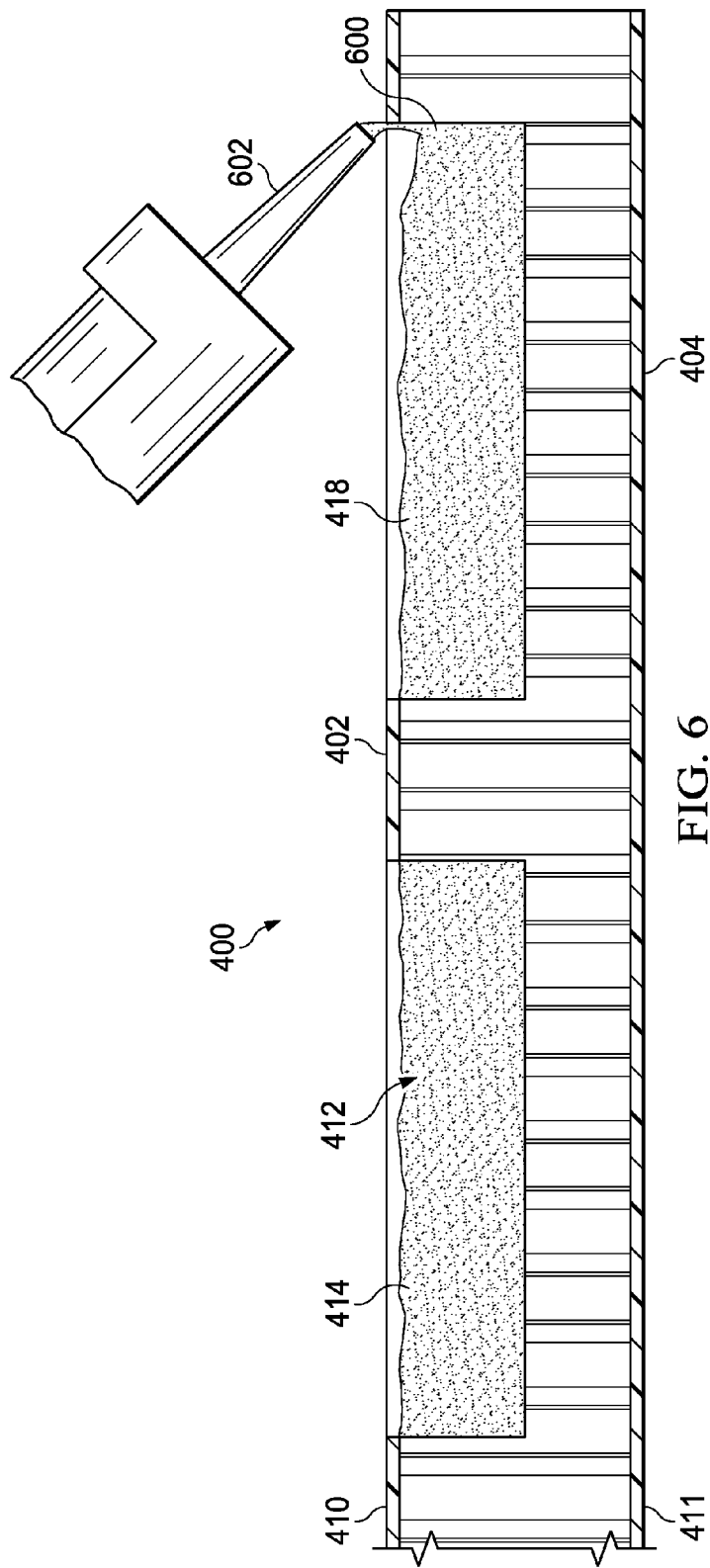
FIG. 6 is an illustration of a cross-sectional view of a second composite structure in accordance with an illustrative embodiment.

Turning now to FIG. 6, an illustration of a cross-sectional view of second composite structure 400 from FIG. 4 is depicted in accordance with an illustrative embodiment. In FIG. 6, a cross-sectional view of second composite structure 400 from FIG. 4 taken along lines 6-6 may be depicted. Slot 414 and slot 418 may be seen in this view.

As depicted, adhesive 600 may be applied within number of slots 412 using application tool 602. Adhesive 600 may be applied such that adhesive 600 fills substantially the entire volume of each of number of slots 412. In this illustrative example, slot 414 and slot 418 may be filled with adhesive 600.

Figure 7:
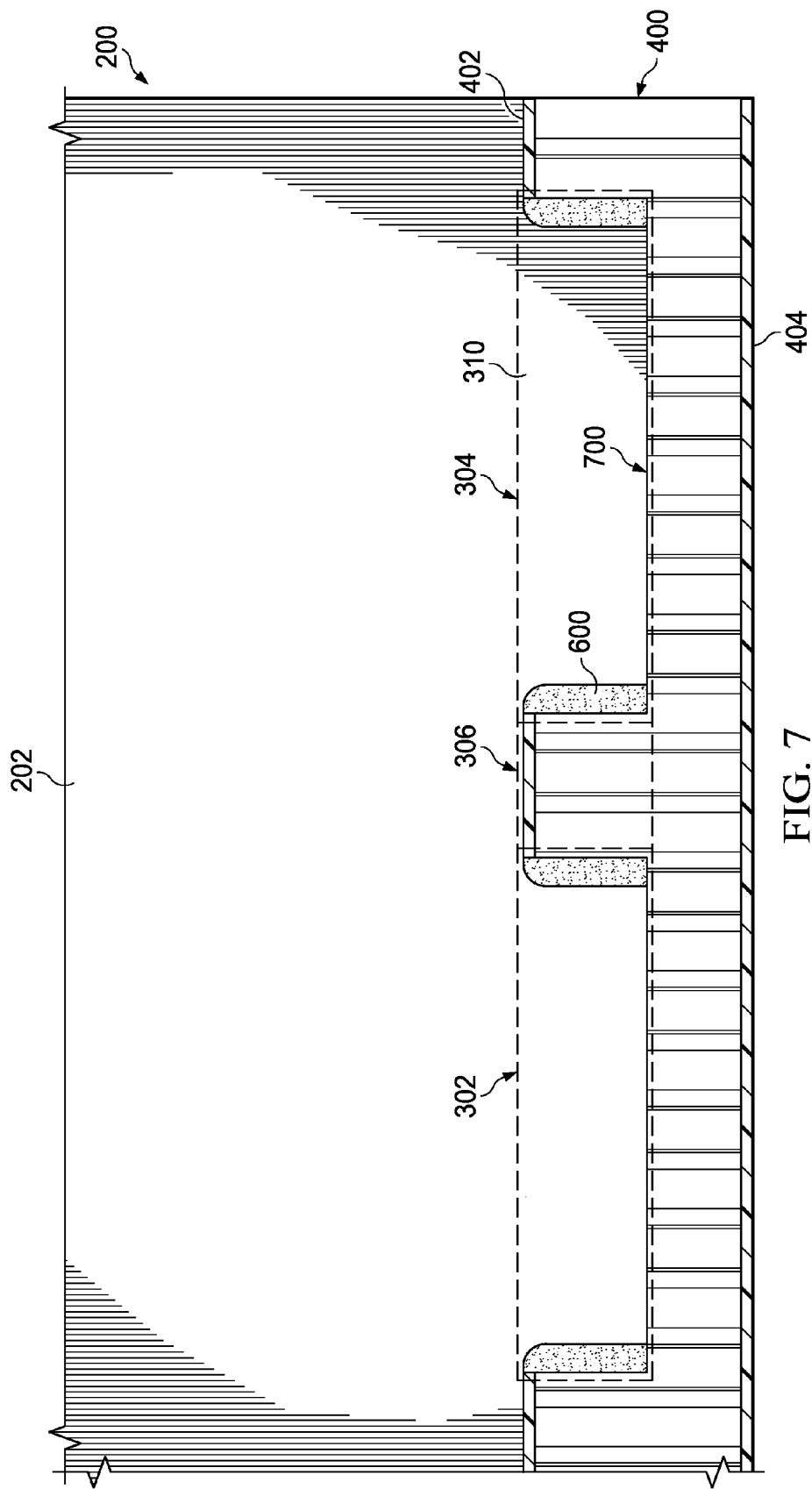
FIG. 7 is an illustration of a cross-sectional view of a joint between a first composite structure a second composite structure in accordance with an illustrative embodiment.

With reference now to FIG. 7, an illustration of a cross-sectional view of a joint between first composite structure 200 from FIGS. 2-3 and second composite structure 400 from FIGS. 4-6 is depicted in accordance with an illustrative embodiment. As depicted, number of tabs 301 on first composite structure 200 may be inserted into number of slots 412 in second composite structure 400 to form joint 700.

When number of tabs 301 is inserted into number of slots 412, edge 212 (not shown in this view) of core 206 (not shown in this view) of first composite structure 200 may substantially conform to first surface 410 of second composite structure 400. In this manner, first composite structure 200 may be attached to second composite structure 400 without any undesired gaps or spaces between first composite structure 200 and second composite structure 400.

Figure 8:
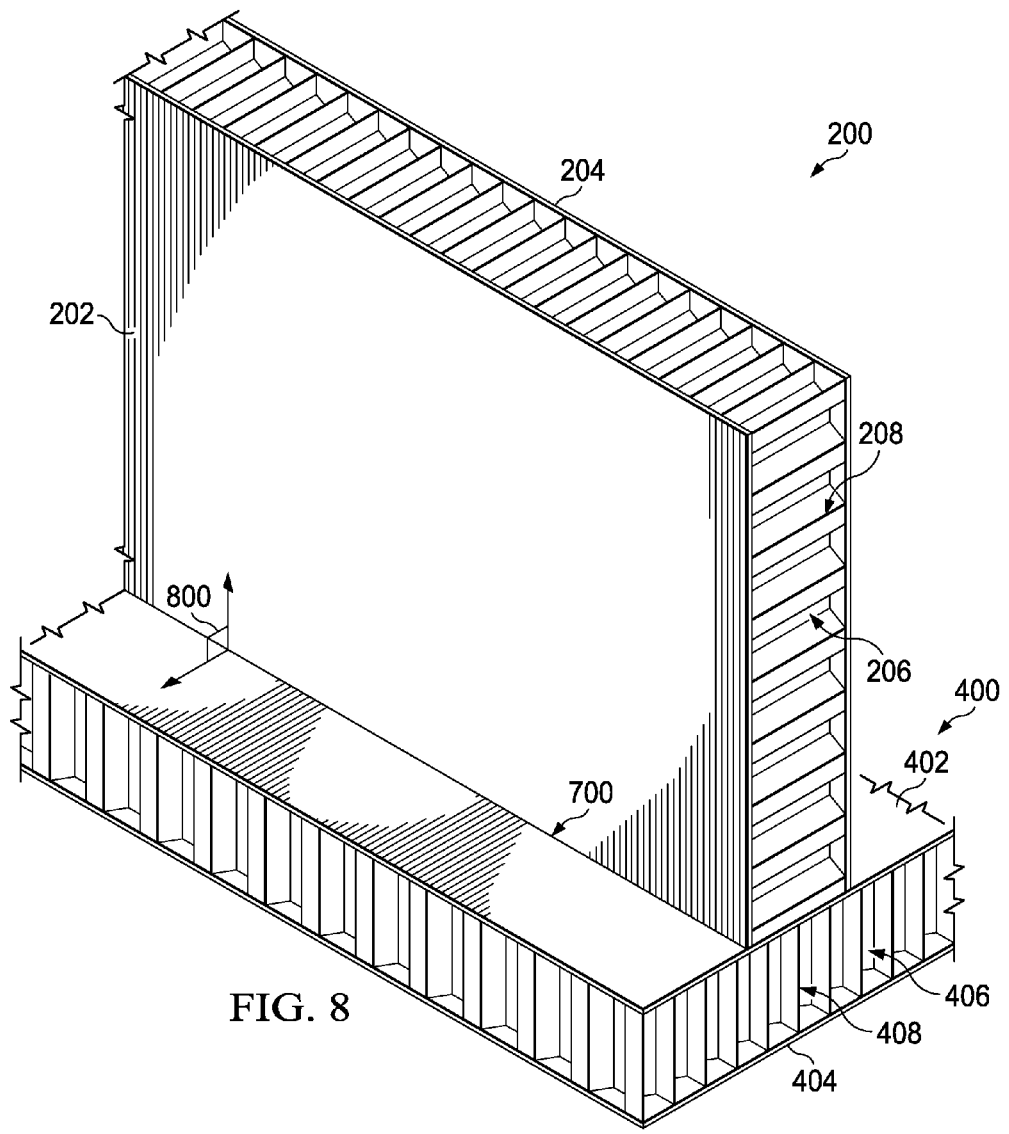
FIG. 8 is an illustration of a top isometric view of a joint in accordance with an illustrative embodiment.

With reference now to FIG. 8, an illustration of a top isometric view of joint 700 from FIG. 7 is depicted in accordance with an illustrative embodiment. As depicted, joint 700 may be formed such that first composite structure 200 is positioned at selected angle 800 relative to second composite structure 400. In this illustrative example, selected angle 800 may be about 90 degrees.

In FIG. 8, excess adhesive 600 from FIG. 6 may not be present on first surface 410 of second composite structure 400. In other words, spillover of adhesive 600 from FIG. 6 may not have occurred when joint 700 was formed. Of course, in other illustrative examples, spillover of adhesive 600 may occur. However, this spillover may be within selected tolerances.

Figure 9:
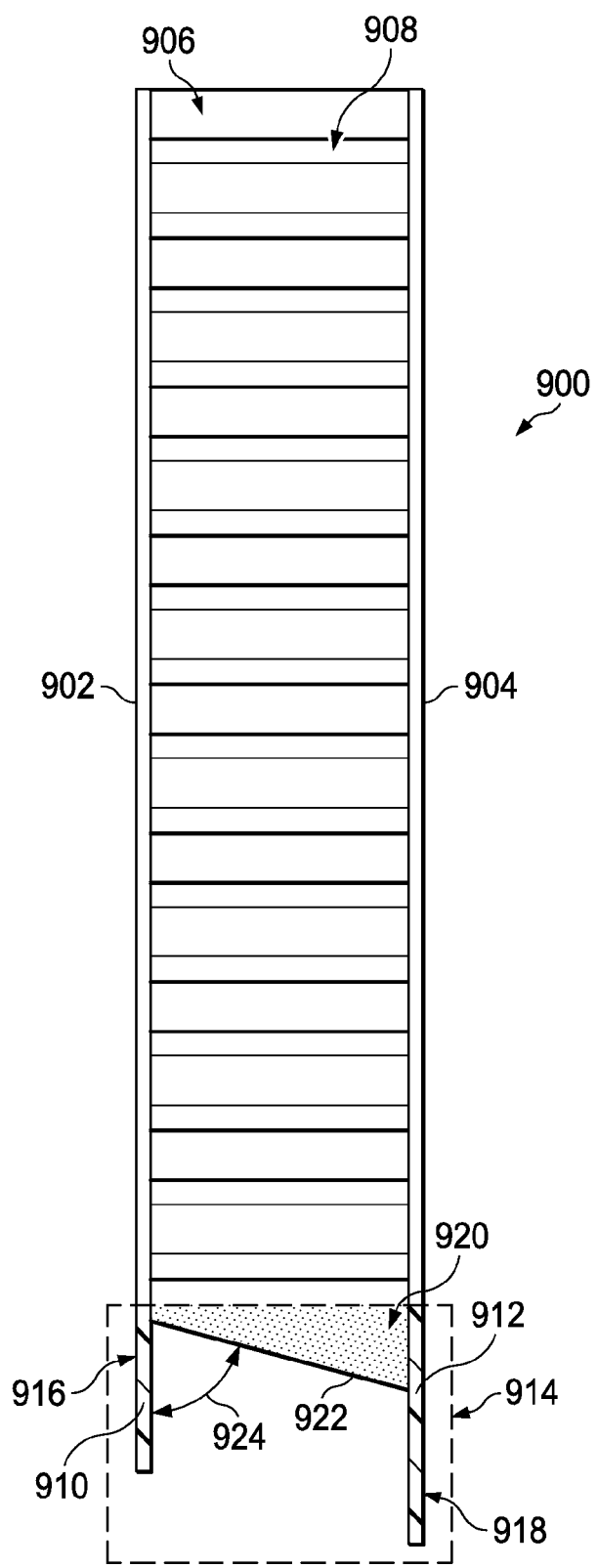
FIG. 9 is an illustration of a cross-sectional view of a first composite structure in accordance with an illustrative embodiment.

With reference now to FIG. 9, an illustration of a cross-sectional view of a first composite structure is depicted in accordance with an illustrative embodiment. In this illustrative example, first composite structure 900 may be an example of one implementation for first composite structure 102 in FIG. 1.

As depicted, first composite structure 900 may comprise first skin 902, second skin 904, and core 906. Core 906 may take the form of honeycomb core 908. First skin 902, second skin 904, and core 906 may be examples of implementations of first skin 106, second skin 108, and core 110, respectively, in FIG. 1.

In this illustrative example, tab 910 and tab 912 may be formed from tab section 914. As depicted, tab section 914 may include first skin section 916 of first skin 902, second skin section 918 of second skin 904, and core section 920 of core 906. A portion of core section 920 may have been removed from tab section 914 to form tab 910 and tab 912. Further, a portion of first section 916 may have been removed from tab section 914 to form tab 910.

In this illustrative example, core 906 may have edge 922. Edge 922 may be formed such that edge 922 is at angle 924 relative to first skin 902 of first composite structure 900. Angle 924 may be about 80 degrees in this depicted example.

Figure 10:
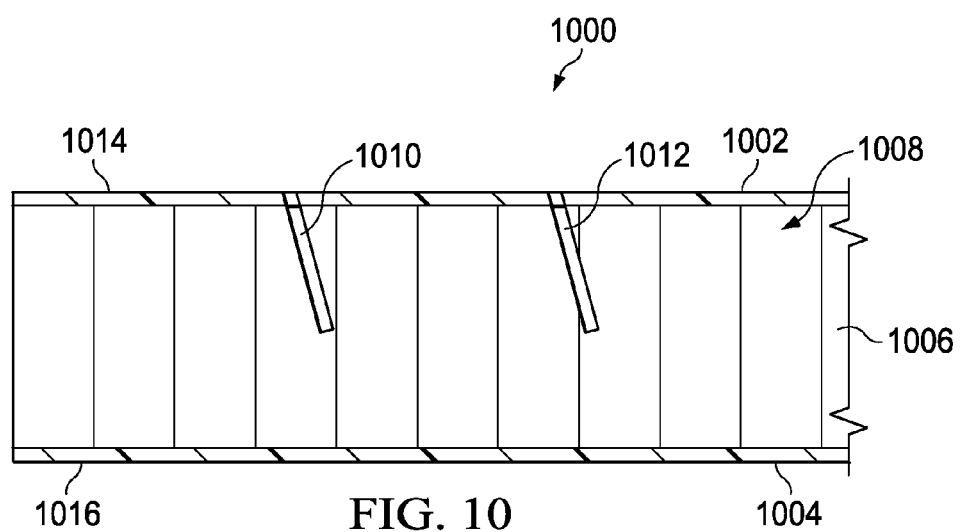
FIG. 10 is an illustration of a cross-sectional view of a portion of a second composite structure in accordance with an illustrative embodiment.

Turning now to FIG. 10, an illustration of a cross-sectional view of a portion of a second composite structure is depicted in accordance with an illustrative embodiment. In FIG. 10, second composite structure 1000 may be an example of one implementation for second composite structure 104 in FIG. 1.

Second composite structure 1000 may comprise first skin 1002, second skin 1004, and core 1006. Core 1006 may take the form of honeycomb core 1008 in this example. As depicted, slot 1010 and slot 1012 may be present at first surface 1014 of second composite structure 1000. Slot 1010 and slot 1012 may extend into core 1006 without reaching second surface 1016 of second composite structure 1000. Slot 1010 and slot 1012 may be configured to receive tab 910 and tab 912, respectively, from FIG. 9.

Figure 11:
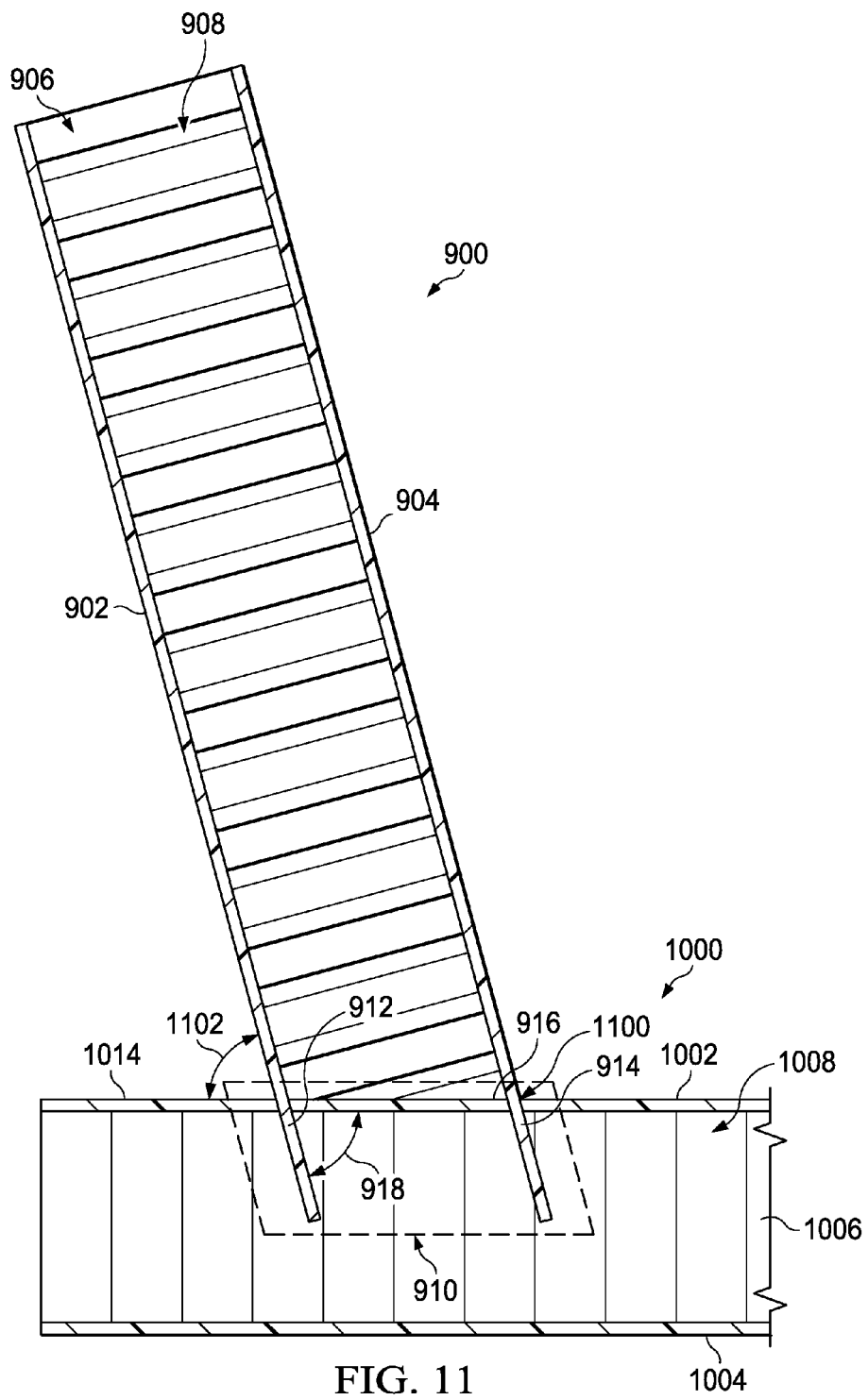
FIG. 11 is an illustration of a cross-sectional view of a joint between a first composite structure and a second composite structure in accordance with an illustrative embodiment.

With reference now to FIG. 11, an illustration of a cross-sectional view of a joint between first composite structure 900 from FIG. 9 and second composite structure 1000 from FIG. 10 is depicted in accordance with an illustrative embodiment. In this illustrative example, tab 910 and tab 912 may be inserted into slot 1010 and slot 1012, respectively, to form joint 1100.

As depicted, joint 1100 may be formed at selected angle 1102. In other words, joint 1100 may be formed such that first composite structure 900 is positioned at selected angle 1102 relative to second composite structure 1000. Selected angle 1102 may be about 80 degrees in this depicted example. In particular, edge 922 of core 906 may substantially conform to first surface 1014 of second composite structure such that joint 1100 is formed at selected angle 1102.

Figure 12:
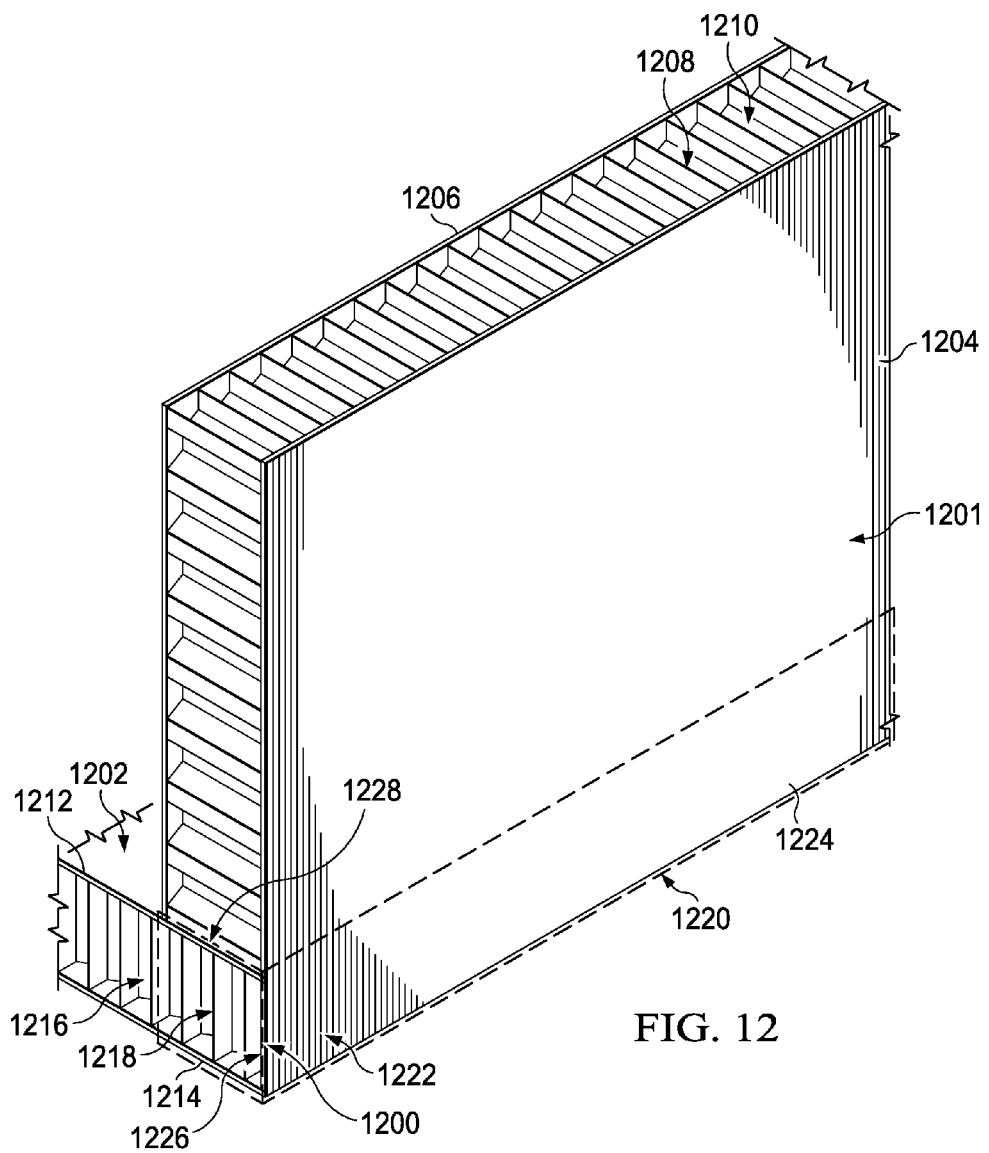
FIG. 12 is an illustration of a corner joint in accordance with an illustrative embodiment.

With reference now to FIG. 12, an illustration of a corner joint is depicted in accordance with an illustrative embodiment. In FIG. 12, corner joint 1200 may be an example of one implementation for joint 101 in FIG. 1. Corner joint 1200 may be formed by first composite structure 1201 and second composite structure 1202.

First composite structure 1201 may comprise first skin 1204, second skin 1206, and core 1208. Core 1208 may be honeycomb core 1210. Second composite structure 1202 may comprise first skin 1212, second skin 1214, and core 1216. Core 1216 may be honeycomb core 1218.

As depicted, first composite structure 1201 may have tab section 1220 comprising first skin section 1222. Tab 1224 may be formed from the entire first skin section 1222 in this illustrative example. First composite structure 1201 may be positioned relative to end 1226 of second composite structure 1202 to form corner joint 1200.

In particular, first composite structure 1201 may be positioned relative to end 1226 of second composite structure 1202 such that tab 1224 contacts end 1226 of second composite structure 1202. Adhesive (not shown in this view) applied to end 1226 of second composite structure 1202 and/or end 1226 may allow tab 1224 to adhere to end 1226 to form corner joint 1200. Further, as depicted, core 1208 of first composite structure 1201 may have edge 1228 that contacts first skin 1212 of second composite structure 1202 when corner joint 1200 is formed.

The illustrations of first composite structure 200 in FIGS. 2-3, second composite structure 400 in FIGS. 4-6, joint 700 in FIGS. 7-8, first composite structure 900 in FIG. 9, second composite structure 1000 in FIG. 10, joint 1100 in FIG. 11, and corner joint 1200 in FIG. 12 are not meant to imply physical or architectural limitations to the manner in which an illustrative embodiment may be implemented. Other components in addition to or in place of the ones illustrated may be used. Some components may be optional.

The different components shown in FIGS. 2-12 may be illustrative examples of how components shown in block form in FIG. 1 can be implemented as physical structures. The different components shown in FIGS. 2-12 may be combined with components in FIG. 1, used with components in FIG. 1, or a combination of the two.

Figure 13:
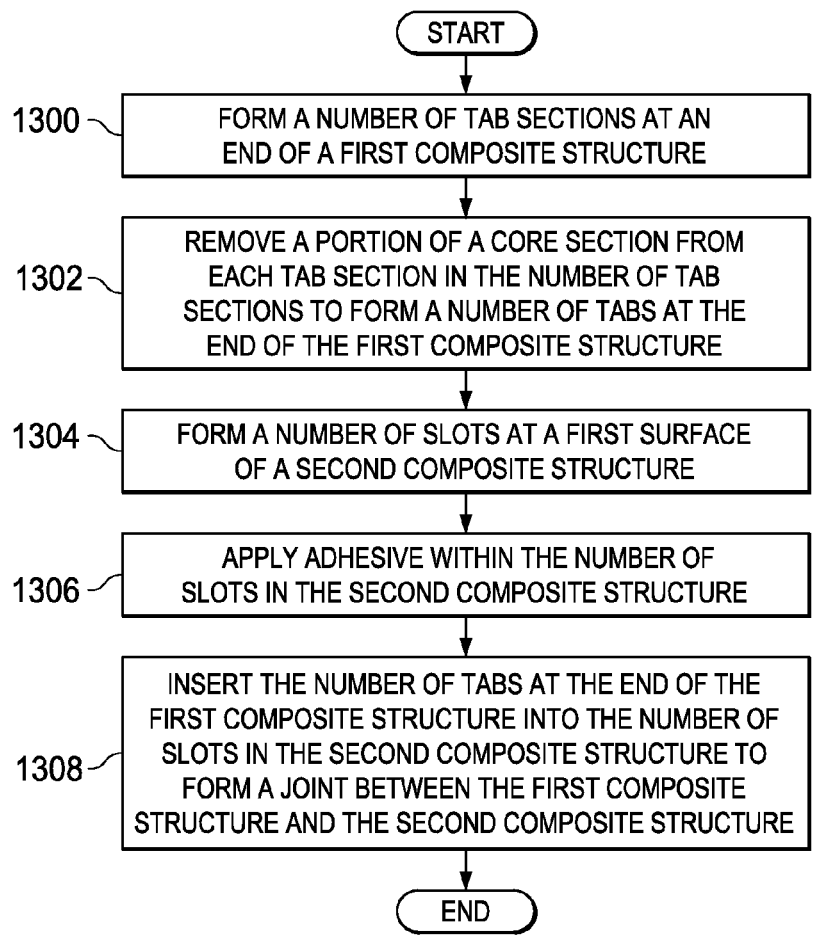
FIG. 13 is an illustration of a process for forming a joint between a first composite structure and a second composite structure, in the form of a flowchart, in accordance with an illustrative embodiment.

With reference now to FIG. 13, an illustration of a process for forming a joint between a first composite structure and a second composite structure, in the form of a flowchart, is depicted in accordance with an illustrative embodiment. The process illustrated in FIG. 13 may be implemented to form a joint, such as, for example, without limitation, joint 101 between first composite structure 102 and second composite structure 104 in FIG. 1.

The process may begin by forming number of tab sections 134 at end 128 of first composite structure 102 (operation 1300). First composite structure 102 may comprise first skin 106, second skin 108, and core 110. Core 110 may be located between first skin 106 and second skin 108. In particular, core 110 may take the form of honeycomb core 112 sandwiched between first skin 106 and second skin 108. A tab section in number of tab sections 134, such as tab section 138, may comprise first skin section 140 of first skin 106, second skin section 142 of second skin 108, and core section 144 of the core 110.

Thereafter, a portion of core section 144 may be removed from each tab section in number of tab sections 134 to form number of tabs 126 at end 128 of first composite structure 102 (operation 1302). In some illustrative examples, in operation 1302, at least one of a portion of first skin section 140 and a portion of second skin section 142 may be removed from each tab section in number of tab sections 134 in addition to the portion of core section 144.

Next, number of slots 130 may be formed at first surface 132 of second composite structure 104 (operation 1304). In operation 1304, number of slots 130 may be formed such that each slot in number of slots 130 extends towards second surface 160 of second composite structure 104 without reaching second surface 160.

Then, adhesive 162 may be applied within number of slots 130 in second composite structure 104 (operation 1306). In operation 1306, adhesive 162 may be applied such that adhesive 162 fills number of slots 130.

Thereafter, number of tabs 126 at end 128 of first composite structure 102 may be inserted into number of slots 130 in second composite structure 104 to form joint 101 between first composite structure 102 and second composite structure 104 (operation 1308), with the process terminating thereafter. When first composite structure 102 is attached to second composite structure 104, edge 156 of core 110 of first composite structure 102 may substantially conform to first surface 132 of second composite structure 104.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, segment, function, and/or a portion of an operation or step.

In some alternative implementations of an illustrative embodiment, the function or functions noted in the blocks may occur out of the order noted in the figures. For example, without limitation, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Illustrative embodiments of the disclosure may be described in the context of aircraft manufacturing and service method 1400 as shown in FIG. 14 and aircraft 1500 as shown in FIG. 15. Turning first to FIG. 14, an illustration of an aircraft manufacturing and service method is depicted in accordance with an illustrative embodiment. During pre-production, aircraft manufacturing and service method 1400 may include specification and design 1402 of aircraft 1500 in FIG. 15 and material procurement 1404.

During production, component and subassembly manufacturing 1406 and system integration 1408 of aircraft 1500 in FIG. 15 takes place. Thereafter, aircraft 1500 in FIG. 15 may go through certification and delivery 1410 in order to be placed in service 1412. While in service 1412 by a customer, aircraft 1500 in FIG. 15 is scheduled for routine maintenance and service 1414, which may include modification, reconfiguration, refurbishment, and other maintenance or service.

Each of the processes of aircraft manufacturing and service method 1400 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 15, an illustration of an aircraft in the form of a block diagram is depicted in which an illustrative embodiment may be implemented. In this example, aircraft 1500 is produced by aircraft manufacturing and service method 1400 in FIG. 14 and may include airframe 1502 with plurality of systems 1504 and interior 1506. Examples of systems 1504 include one or more of propulsion system 1508, electrical system 1510, hydraulic system 1512, and environmental system 1514. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1400 in FIG. 14. For example, without limitation, one or more components in aircraft 1500 may be formed by forming joints, such as, joint 101 between first composite structure 102 and second composite structure 104 in FIG. 1. These types of joints may be formed during material procurement 1404, component and subassembly manufacturing 1406, system integration 1408, routine maintenance and service 1414, and/or other stages of aircraft manufacturing and service method 1400.

In one illustrative example, components or subassemblies produced in component and subassembly manufacturing 1406 in FIG. 14 may be fabricated or manufactured in a manner similar to components or subassemblies produced while aircraft 1500 is in service 1412 in FIG. 14. As yet another example, one or more apparatus embodiments, method embodiments, or a combination thereof may be utilized during production stages, such as component and subassembly manufacturing 1406 and system integration 1408 in FIG. 14. One or more apparatus embodiments, method embodiments, or a combination thereof may be utilized while aircraft 1500 is in service 1412 and/or during maintenance and service 1414 in FIG. 14. The use of a number of the different illustrative embodiments may substantially expedite the assembly of and/or reduce the cost of aircraft 1500.

Although an aerospace embodiment is described above, the different illustrative embodiments provide a method and apparatus for forming a joint, such as joint 101 in FIG. 1, which may be used when forming any number of different types of components. The method and apparatus provided by the illustrative embodiments may be used to form joints between composite structures for objects in space vehicles, ground vehicles, unmanned aerial vehicles (UAVs), ships, submarines, tanks, missiles, equipment, robotic vehicles, carts, desks, buildings, and/or other types of objects and structures.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for forming a joint between a first composite structure and a second composite structure, the method comprising:
    forming a number of tab sections at an end of the first composite structure in which the first composite structure comprises a first skin, a second skin, and a core located between the first skin and the second skin and in which a tab section in the number of tab sections comprises a first skin section of the first skin, a second skin section of the second skin, and a core section of the core;
    removing a portion of the core section from each tab section in the number of tab sections to form a number of tabs at the end of the first composite structure; and
    attaching the first composite structure to the second composite structure using the number of tabs at the end of the first composite structure to form the joint between the first composite structure and the second composite structure.

2. The method of claim 1 further comprising:
    forming a number of slots in the second composite structure in which each slot in the number of slots is configured to receive a tab in the number of tabs.

3. The method of claim 2, wherein the step of forming the number of slots in the second composite structure comprises:
    forming the number of slots at a first surface of the second composite structure in which the each slot in the number of slots extends towards a second surface of the second composite structure without reaching the second surface.

4. The method of claim 3, wherein the step of attaching the first composite structure to the second composite structure using the number of tabs at the end of the first composite structure to form the joint between the first composite structure and the second composite structure comprises:
    inserting the number of tabs at the end of the first composite structure into the number of slots in the second composite structure to form the joint.

5. The method of claim 4, wherein the step of attaching the first composite structure to the second composite structure using the number of tabs at the end of the first composite structure to form the joint between the first composite structure and the second composite structure further comprises:
    applying adhesive within the number of slots in the second composite structure prior to inserting the number of tabs at the end of the first composite structure into the number of slots in the second composite structure.

6. The method of claim 1, wherein the step of removing the portion of the core section from the each tab section in the number of tab sections to form the number of tabs at the end of the first composite structure comprises:
    removing the portion of the core section from the each tab section and at least one of a portion of the first skin section and a portion of the second skin section from the each tab section to form the number of tabs at the end of the first composite structure.

7. The method of claim 1, wherein the step of removing the portion of the core section from the each tab section in the number of tab sections to form the number of tabs at the end of the first composite structure comprises:
    removing the core section entirely and the first skin section entirely from the each tab section in the number of tab sections to form the number of tabs.

8. The method of claim 7, wherein the step of attaching the first composite structure to the second composite structure using the number of tabs at the end of the first composite structure to form the joint between the first composite structure and the second composite structure comprises:
    applying adhesive to an end of the second composite structure; and
    attaching the number of tabs to the end of the second composite structure such that an edge of the core of the first composite structure contacts a surface of the second composite structure.

9. The method of claim 1, wherein the step of removing the portion of the core section from the each tab section in the number of tab sections to form the number of tabs at the end of the first composite structure comprises:
    removing the core section entirely and a portion of the first skin section from the each tab section in the number of tab sections to form the number of tabs.

10. The method of claim 9, wherein the step of attaching the first composite structure to the second composite structure using the number of tabs at the end of the first composite structure to form the joint between the first composite structure and the second composite structure comprises:

applying adhesive within a number of slots in the second composite structure and to an end of the second composite structure; and inserting a first portion of the number of tabs into the number of slots in the second composite structure such that a second portion of the number of tabs contacts and adheres to the end of the second composite structure.

11. The method of claim 1, wherein performing the steps of forming the number of tab sections at the end of the first composite structure and removing the portion of the core section from the each tab section in the number of tab sections to form the number of tabs at the end of the first composite structure forms an edge for the core of the first composite structure in which the edge of the core is configured to substantially conform to a surface of the second composite structure when the first composite structure is attached to the second composite structure.

12. A method for forming a joint between a first composite structure and a second composite structure, the method comprising:

forming a number of tab sections at an end of the first composite structure in which the first composite structure comprises a first skin, a second skin, and a core located between the first skin and the second skin and in which a tab section in the number of tab sections comprises a first skin section of the first skin, a second skin section of the second skin, and a core section of the core;

removing a portion of the core section from each tab section in the number of tab sections to form a number of tabs at the end of the first composite structure;

forming a number of slots at a first surface of the second composite structure in which each slot in the number of slots extends towards a second surface of the second composite structure without reaching the second surface;

applying adhesive within the number of slots in the second composite structure; and inserting the number of tabs at the end of the first composite structure into the number of slots in the second composite structure to form the joint between the first composite structure and the second composite structure in which an edge of the core of the first composite structure substantially conforms to the first surface of the second composite structure when the first composite structure is attached to the second composite structure.

* * * * *